United States Patent
Wagner et al.

(10) Patent No.: US 10,643,286 B2
(45) Date of Patent: *May 5, 2020

(54) KNOWLEDGE MANAGEMENT TOOL INTERFACE

(71) Applicant: Hartford Fire Insurance Company, Hartford, CT (US)

(72) Inventors: Mark Richard Wagner, West Hartford, CT (US); Sandra J. Stevens, Mansfield Center, CT (US); Belinda A. Lellock, Clearbrook, VA (US); Anthony Jason Ma'luf, Winston-Salem, NC (US); Kurt E. Grashaw, Tariffville, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,049

(22) Filed: Feb. 22, 2019

(65) Prior Publication Data

US 2019/0188801 A1  Jun. 20, 2019

Related U.S. Application Data

(63) Continuation of application No. 14/570,755, filed on Dec. 15, 2014, now Pat. No. 10,217,171.

(51) Int. Cl.
 *G06Q 40/08* (2012.01)
(52) U.S. Cl.
 CPC .................... *G06Q 40/08* (2013.01)
(58) Field of Classification Search
 CPC ...................................... G06Q 40/00
 USPC ............................................................ 705/4
 See application file for complete search history.

(56) References Cited

U.S. PATENT DOCUMENTS

| | | | | |
|---|---|---|---|---|
| 5,991,750 A | * | 11/1999 | Watson | G06Q 20/00 |
| | | | | 705/2 |
| 6,507,852 B1 | * | 1/2003 | Dempsey | G06F 16/2358 |
| 7,124,112 B1 | * | 10/2006 | Guyan | G06Q 20/40 |
| | | | | 705/44 |
| 7,214,112 B2 | | 5/2007 | Gibbs | |
| 7,389,247 B2 | * | 6/2008 | Pestoni | G06Q 30/06 |
| | | | | 705/4 |

(Continued)

OTHER PUBLICATIONS

Ballard et. al. Moving Forward with the on Demand Real-time Enterprise, Chuck Ballard (Sep. 2006) (Real Time).*

(Continued)

*Primary Examiner* — Chikaodinaka Ojiaku
(74) *Attorney, Agent, or Firm* — Howard IP Law Group PC

(57) ABSTRACT

According to some embodiments, a communication may be received from a customer in connection with an insurance policy. A system may then transmit, to a service representative device, data associated with an insurance knowledge management enterprise portal displaying information to facilitate interaction with the customer. A type of insurance event associated with the communication from the customer may be determined, and customized data associated with the insurance knowledge management enterprise portal may be transmitted to the service representative device, the customized data being based at least in part on the type of insurance event associated with the communication from the customer.

16 Claims, 19 Drawing Sheets

(56) References Cited

U.S. PATENT DOCUMENTS

| | | | |
|---|---|---|---|
| 7,406,427 B1* | 7/2008 | Guyan | G06Q 40/08 |
| | | | 705/4 |
| 7,409,355 B1* | 8/2008 | Guyan | G06Q 40/08 |
| | | | 705/4 |
| 8,046,387 B2 | 10/2011 | Nelson | |
| 8,224,767 B2 | 7/2012 | Swaminathan et al. | |
| 8,380,621 B1* | 2/2013 | Bent | G06Q 40/02 |
| | | | 705/35 |
| 8,452,622 B1* | 5/2013 | Martin | G06Q 10/10 |
| | | | 705/2 |
| 8,589,196 B2 | 11/2013 | Grace et al. | |
| 8,682,814 B2* | 3/2014 | DiCorpo | G06Q 10/0631 |
| | | | 706/12 |
| 8,805,718 B2 | 8/2014 | Haywood et al. | |
| 9,183,594 B1* | 11/2015 | Sander | H04W 4/021 |
| 9,363,282 B1* | 6/2016 | Yu | H04L 63/1425 |
| 9,505,494 B1* | 11/2016 | Marlow | B64C 39/024 |
| 10,152,596 B2* | 12/2018 | Pieczul | G06F 21/566 |
| 2002/0116388 A1 | 8/2002 | Clement et al. | |
| 2002/0169715 A1* | 11/2002 | Ruth | G06Q 20/10 |
| | | | 705/40 |
| 2003/0204421 A1* | 10/2003 | Houle | G06Q 10/10 |
| | | | 705/4 |
| 2004/0143464 A1* | 7/2004 | Houle | G06Q 10/10 |
| | | | 705/4 |
| 2005/0108063 A1* | 5/2005 | Madill, Jr. | G06Q 40/08 |
| | | | 705/4 |
| 2005/0211765 A1* | 9/2005 | Brown | G06Q 20/102 |
| | | | 235/379 |
| 2007/0083399 A1* | 4/2007 | Bryan | G06Q 20/10 |
| | | | 705/4 |
| 2007/0088564 A1* | 4/2007 | March, Jr. | G06F 19/328 |
| | | | 705/2 |
| 2008/0172258 A1* | 7/2008 | Weger | G06Q 10/00 |
| | | | 705/4 |
| 2009/0112678 A1 | 4/2009 | Luzardo | |
| 2009/0157436 A1* | 6/2009 | Craycraft | G06Q 10/10 |
| | | | 705/4 |
| 2010/0145734 A1* | 6/2010 | Becerra | G06Q 40/08 |
| | | | 705/4 |
| 2010/0223160 A1* | 9/2010 | Brown | G06Q 20/102 |
| | | | 705/26.1 |
| 2011/0093299 A1* | 4/2011 | Stepeck | G06Q 40/08 |
| | | | 705/4 |
| 2011/0161118 A1* | 6/2011 | Borden | G06Q 40/08 |
| | | | 705/4 |
| 2012/0016693 A1* | 1/2012 | Haywood | G06Q 40/08 |
| | | | 705/4 |
| 2014/0089191 A1* | 3/2014 | Brown | G06Q 20/12 |
| | | | 705/44 |
| 2014/0162598 A1* | 6/2014 | Villa-Real | H04M 1/66 |
| | | | 455/411 |
| 2014/0222471 A1* | 8/2014 | Gueh | G06Q 30/012 |
| | | | 705/4 |
| 2014/0279686 A1* | 9/2014 | Avery | G06Q 40/04 |
| | | | 705/36 R |
| 2014/0304007 A1* | 10/2014 | Kimball | G06Q 40/08 |
| | | | 705/4 |
| 2014/0304008 A1* | 10/2014 | Dorris | G06Q 40/08 |
| | | | 705/4 |
| 2014/0365246 A1* | 12/2014 | Hayward | G06Q 40/08 |
| | | | 705/4 |
| 2014/0372151 A1* | 12/2014 | Karamchedu | G06Q 40/08 |
| | | | 705/4 |
| 2015/0032481 A1* | 1/2015 | Norling-Christensen | |
| | | | G06Q 40/08 |
| | | | 705/4 |
| 2015/0066542 A1* | 3/2015 | Dubens | G06Q 40/08 |
| | | | 705/4 |
| 2015/0066543 A1* | 3/2015 | Dubens | G06Q 40/08 |
| | | | 705/4 |
| 2015/0066544 A1* | 3/2015 | Hinson | G06Q 40/08 |
| | | | 705/4 |
| 2015/0081319 A1* | 3/2015 | Kemp | G06Q 40/08 |
| | | | 705/2 |
| 2015/0170287 A1* | 6/2015 | Tirone | G06Q 40/08 |
| | | | 705/4 |
| 2015/0178850 A1* | 6/2015 | Machnicki | G06Q 40/08 |
| | | | 705/4 |
| 2015/0187011 A1* | 7/2015 | Purandare | G06Q 40/08 |
| | | | 705/4 |
| 2015/0187013 A1* | 7/2015 | Adams | G06Q 30/0283 |
| | | | 705/4 |
| 2015/0193882 A1* | 7/2015 | Jackson | G06Q 40/08 |
| | | | 705/4 |
| 2016/0012445 A1* | 1/2016 | Villa-Real | G06Q 20/32 |
| | | | 705/44 |
| 2016/0055588 A1* | 2/2016 | Keenan | G06Q 40/08 |
| | | | 705/4 |
| 2016/0217530 A1* | 7/2016 | Hashim | G06Q 40/08 |
| 2017/0039307 A1* | 2/2017 | Koger | G06F 17/5004 |

OTHER PUBLICATIONS

Handel, Insurance Telematics: Opportunities and Challenges with the Smartphone Solution, IEEE Intelligent Transportation Systems Magazine (vol. 6, Issue: 4, pp. 57-70) (2014) (Telematics).*

* cited by examiner

KNOWLEDGE MANAGEMENT TOOL

INSURANCE KNOWLEDGE MANAGEMENT ENTERPRISE PORTAL: DIRECTORY PAGE

GENERAL DIRECTORY

CLICK ON NAME TO VIEW ADDITIONAL INFORMATION SUCH AS ADDRESS AND HOURS OF OPERATION

FIND AN ITEM

| NAME | PHONE | EMPLOYEE CONTACT | EMPLOYEE PHONE |
|---|---|---|---|
| A (36) | | | |
| B (7) | | | |
| BALL CORPORATION DISABILITY LINE | 800-123-4567 | | |
| BITUMINOUS | 800-123-4567 | | |
| BOILER CLAIMS | 800-123-4567 | | |
| BOND SALES (THE HARTFORD) | 800-123-4567 | | |
| BOND/EMPLOYEE DISHONESTY CLAIMS | 800-123-4567 | | |
| BUSINESS APPLICATION SYSTEM | 800-123-4567 | | |
| BUSINESS CENTER – SAN ANTONIO | 800-123-4567 | | |
| C (30) | | | |

FIG. 8

KNOWLEDGE MANAGEMENT TOOL

INSURANCE KNOWLEDGE MANAGEMENT ENTERPRISE PORTAL: OFFICE DIRECTORY PAGE

CUSTOMER CARE TEAM: CATASTROPHE OFFICE — 1010

| | |
|---|---|
| PHONE NUMBER | 800-123-4567 |
| FAX NUMBER | 800-987-6543 |
| MAILING ADDRESS | THE HARTFORD INSURANCE GROUP<br>123 MAIN STREET<br>LEXINGTON, KY 12345 |
| DELIVERY ADDRESS | THE HARTFORD INSURANCE GROUP<br>PO BOX 123<br>AURORA IL 12345 |
| EMAIL ADDRESS | CLAIMS@THEHARTFORD.COM |
| PROPERTY GATEKEEPER LIST | PROPERTY_GATEKEEPER_LIST |

CAT AFTER HOURS CONTACTS

| START DATE | END DATE | ON CALL CONTACT | PRIMARY PHONE | TEAM LEADER | TEAM LEADER PHONE — 1020 |
|---|---|---|---|---|---|
| 10/13/2018 | 10/19/2018 | BROWN, LISA | 123-456-7890 | WEST, JANE | 123-555-5555 |
| 10/20/2018 | 10/26/2018 | JONES, JOHN | 321-987-6543 | SMITH, LARRY | 321-555-5555 |

FIG. 10

KNOWLEDGE MANAGEMENT TOOL INTERFACE

CROSS-REFERENCE TO RELATED APPLICATIONS

This application is a continuation application of co-pending U.S. patent application Ser. No. 14/570,755 entitled "System To Administer Insurance Knowledge Management Tool" and filed on Dec. 15, 2014, the entire contents of which are incorporated herein by reference for all purposes.

FIELD

The present invention relates to computer systems and more particularly to computer systems that provide an insurance knowledge management tool.

BACKGROUND

An insurer may provide payments when claims are made in connection with an insurance policy. For example, an insurance customer who is injured while visiting a business may contact an insurance company requesting payment in connection with a liability or group benefit insurance policy that was purchased by the business. Similarly, an insurance customer who was involved in an automobile accident may contact an insurance company requesting payment in connection with his or her automobile insurance policy. In addition to submitting new insurance claims, insurance customers might contact an insurance company for any of a number of other reasons, such as to inquire about the current status of a previously filed claim, to ask about a hypothetical situation, to determine office hours, etc. The insurer may assign a service representative to communicate with an insurance customer to receive relevant information about a new or existing insurance claim (e.g., party names and addresses, accident details, injury information, etc.) and/or to help the customer in other ways.

In one approach, a service representative receives training and/or customer care documents to help him or her respond to customer requests appropriately. This, however, may be a time consuming process and can lead to errors or delays while interacting with the customer, especially when there are a substantial number of customer requests, of many different types, that need responses. For example, an insurer might receive tens of thousands of insurance customer telephone calls (which might represent a substantial number of different types of team member interactions with customers). It would therefore be desirable to provide systems and methods to facilitate interactions between insurance customers and service representatives in an automated, efficient, and accurate manner.

SUMMARY

According to some embodiments, systems, methods, apparatus, computer program code and means may facilitate interactions between insurance customers and service representatives. In some embodiments, a communication may be received from a customer in connection with an insurance policy. A system may then transmit, to a service representative device, data associated with an insurance knowledge management enterprise portal displaying information to facilitate interaction with the customer. A type of insurance event associated with the communication from the customer may be determined, and customized data associated with the insurance knowledge management enterprise portal may be transmitted to the service representative device, the customized data being based at least in part on the type of insurance event associated with the communication from the customer.

A technical effect of some embodiments of the invention is an improved and computerized method to facilitate interactions between insurance customers and service representatives. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 illustrates an insurance knowledge management enterprise portal directory page display according to some embodiments.

FIG. 10 illustrates an insurance knowledge management enterprise portal office directory page display according to some embodiments.

DETAILED DESCRIPTION

Note that some embodiments may be associated with an insurance claim process associated with different types of insurance, including personal and commercial automobile insurance, long term disability insurance, short term disability insurance, flexible combinations of short and long term disability insurance, homeowners insurance, personal and commercial property insurance, general liability insurance, etc.

Figure 1:
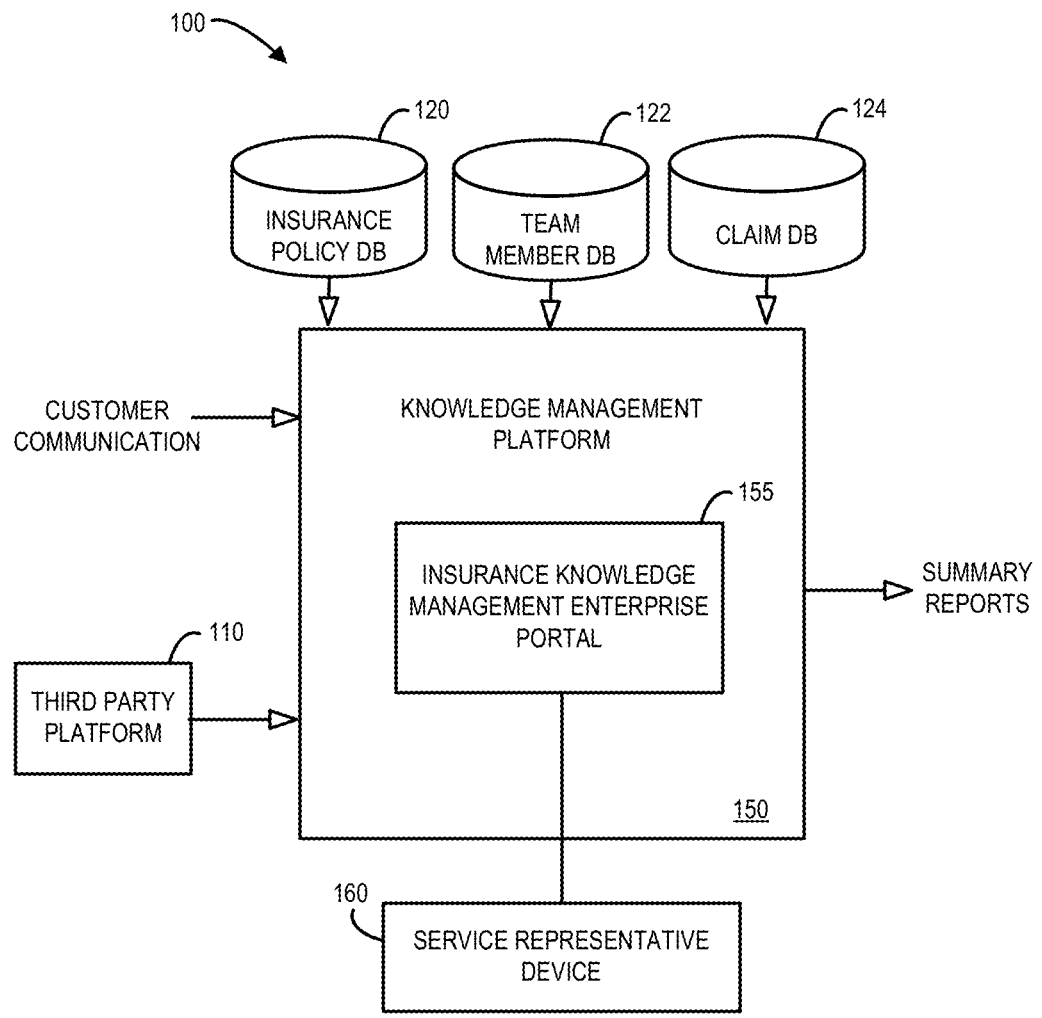
FIG. 1 is block diagram of a knowledge management tool system according to some embodiments of the present invention.

Manually training service representatives and/or providing manuals to help them respond to customer requests appropriately may be a time consuming and lead to errors, especially when there are a substantial number of customer requests, of many different types, that need responses. It would therefore be desirable to provide systems and methods to facilitate interactions between insurance customers and service representatives. FIG. 1 is block diagram of a system 100 according to some embodiments of the present invention. In particular, the system 100 includes a knowledge management platform 150 that receives a customer communication (e.g., by receiving a telephone call from the customer). According to some embodiments, the knowledge management platform 150 may retrieve information from an insurance policy database 120, a team member database 122, and/or a claim database 124. In some embodiments, the knowledge management platform 150 may also receive information from a third party platform 110 (e.g., when the knowledge management platform 150 is associated with an automobile insurance system, some information may be copied from a state department of motor vehicles platform). In other embodiments, some or all of the information about customer communication may be received via a claim submission process.

The knowledge management platform 150 may, according to some embodiments, include an insurance knowledge management enterprise portal 155. This insurance knowledge management enterprise portal 155 may transmit information to, for example, a service representative device 160.

The knowledge management platform 150 might be, for example, associated with A Personal Computer ("PC"), laptop computer, an enterprise server, a server farm, and/or a database or similar storage devices. The knowledge management platform 150 may, according to some embodiments, be associated with an insurance provider.

According to some embodiments, an "automated" knowledge management platform 150 may facilitate interactions between the customer and the service representative. For example, the knowledge management platform 150 may automatically output a script or template via the service representative device 160. As used herein, the term "automated" may refer to, for example, actions that can be performed with little (or no) intervention by a human. Moreover, any of the embodiments described herein may be "dynamically" performed by monitoring parameters and/or automatically updating the enterprise portal 155 in substantially real time.

As used herein, devices, including those associated with the knowledge management platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The knowledge management platform 150 may store information into and/or retrieve information from the databases 120, 122, 124. The databases 120, 122, 124 may be locally stored or reside remote from the insurance claim knowledge management platform 150. According to some embodiments, the knowledge management platform 150 communicates summary reports (e.g., based on a line or business, team member, or office), such as by transmitting an electronic file to a team leader, a client device, an insurance agent or analyst platform, an email server, a workflow management system, etc. In other embodiments, the knowledge management platform 150 might output a recommended portal change to a designer who might accept the change based on that indication or override the indication based on other factors associated with insurance claim processing.

Note that the knowledge management platform 150 may transmit information to other devices or applications, such as email servers, report generators, calendar applications, etc. Note that at least some of the tools and other applications associated with the knowledge management platform 150 might be incorporated within, or utilize, a SHARE-POINT® enterprise portal available from MICROSOFT®.

Although a single knowledge management platform 150 is shown in FIG. 1, any number of such devices may be included. Moreover, various devices described herein might be combined according to embodiments of the present invention. For example, in some embodiments, the knowledge management platform 150 and databases 120, 122, 124 might be co-located and/or may comprise a single apparatus.

Figure 2:
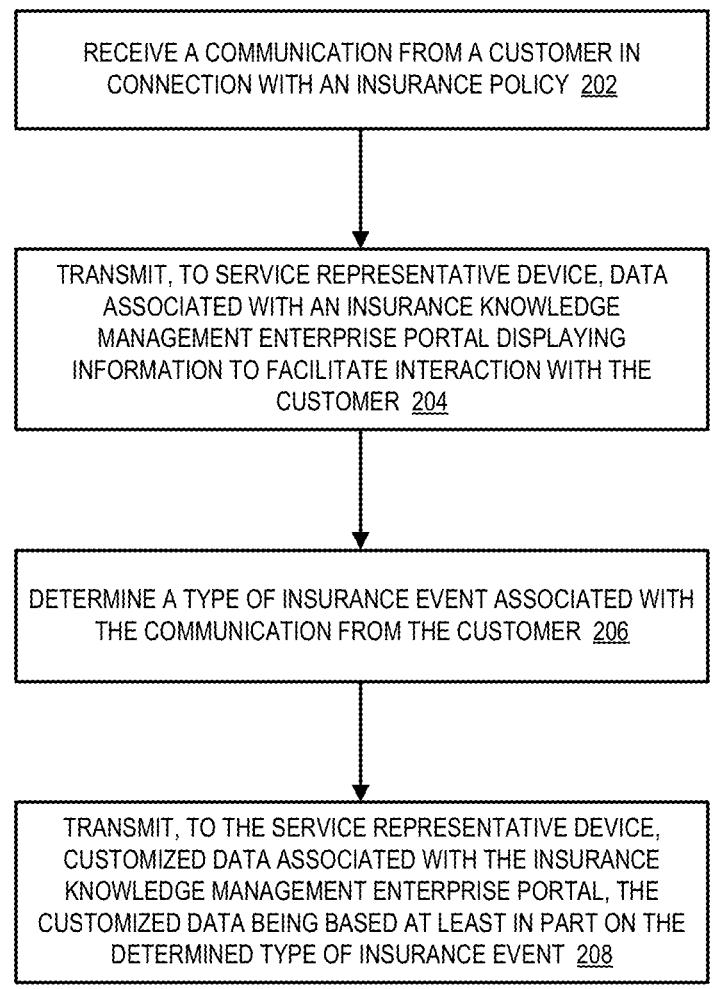
FIG. 2 illustrates a method that might be performed in accordance with some embodiments.

FIG. 2 illustrates an enterprise data sharing architecture method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, a communication, such as a telephone call, may be received from a customer in connection with an insurance policy. The insurance policy may be associated with, for example, commercial automobile insurance, personal automobile insurance, general liability insurance, homeowners liability insurance, commercial property insurance group benefits, and/or personal property insurance.

At 204, data may be transmitted to a service representative device, the data being associated with an insurance knowledge management enterprise portal displaying information to facilitate interaction with the customer. The service representative device may be, according to some embodiments, associated with a call center, an insurance claim processor, an analyst, a customer care team member, claims staff, and/or a performer. The data transmitted at 204 may, for example, comprise a portion of insurance knowledge management enterprise portal information stored at a knowledge management database.

A type of insurance event associated with the communication from the customer may be determined at 206. The insurance event may be associated with, for example, a new insurance claim, an existing insurance claim, a hypothetical insurance claim, and/or a question not related to an insurance claim (e.g., a customer might ask where an office is located and/or for the office's hours of operation). Note that the event may be associated with one of two or more different potential lines of insurance (e.g., incoming calls might be associated with either automobile or general liability insurance policies). The determination of the insurance event might include receiving information from the service representative, detecting an incoming telephone call number, Interactive Voice Response ("IVR") selections made by the customer, etc.

At 208, customized data may be transmitted to the service representative device, the customized data being associated with the insurance knowledge management enterprise portal and based at least in part on the type of insurance event associated with the communication from the customer. According to some embodiments, the "customized" data represent data selected from the knowledge management database and/or data dynamically modified by the knowledge management platform in substantially real time. The customized data may be associated with, for example, a pop up window, a replacement display, and/or a hover-over window. According to some embodiments, the system may automatically determine a role identifier associated with the service representative device, and the customized data may further be based at least in part on information accessed using the automatically determined role identifier. For example, it may be determined that a particular team member specializes in handling certain types of insurance claims. In this case, the portal may be customized to help him or her access information about those types of claims more easily. Similarly, the system may automatically determine an insurance policy identifier associated with the insurance policy, in which case the customized data may further be based at least in part on information accessed using the automatically determined insurance policy identifier. For example, certain information (e.g., names and addresses) may be automatically populated in the portal.

Figure 3:
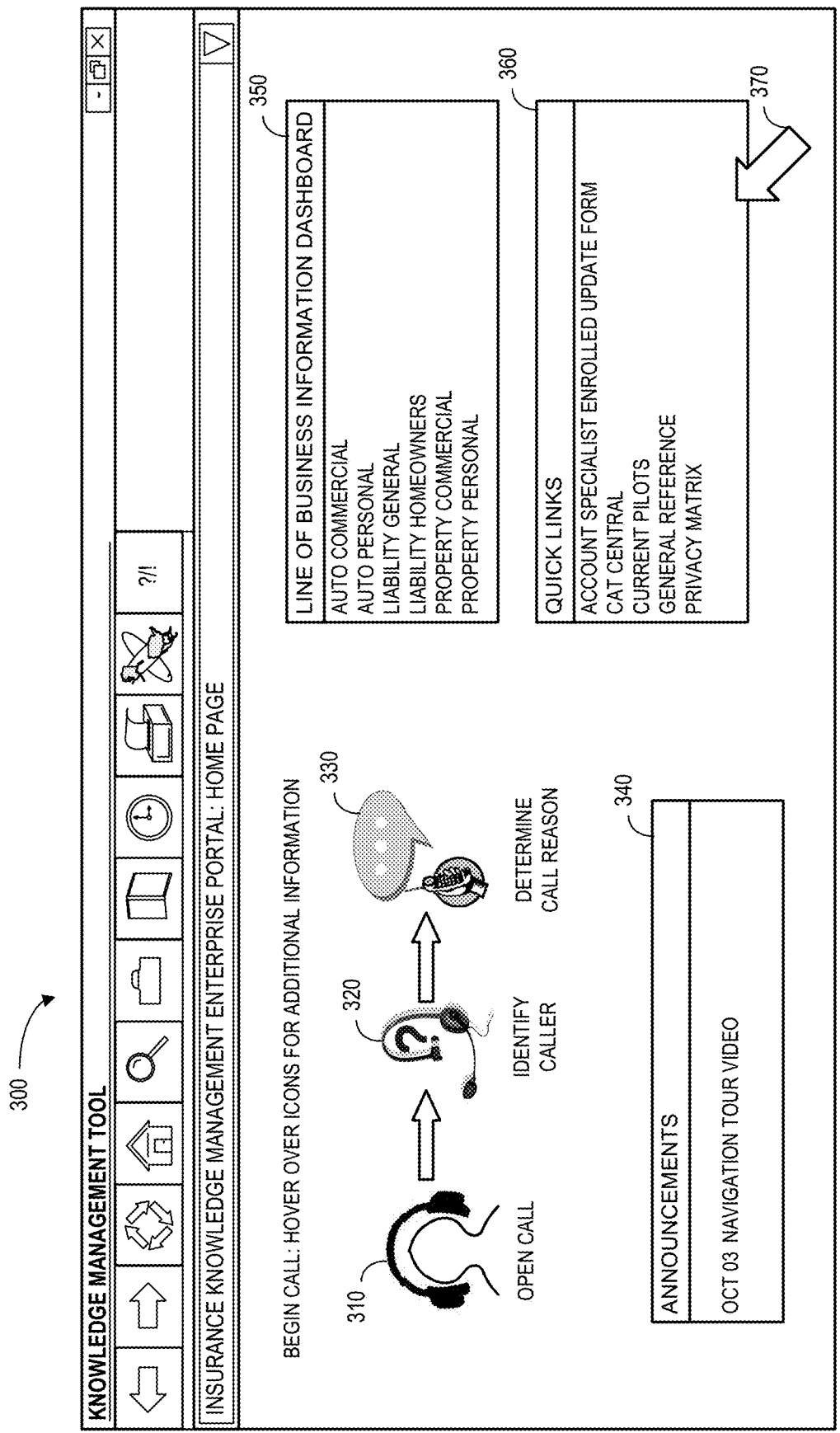
FIG. 3 illustrates an insurance knowledge management enterprise portal home page display in accordance with some embodiments.

FIG. 3 illustrates an insurance knowledge management enterprise portal home page display 300 in accordance with some embodiments. The portal home page display 300 may include an open call icon 310, an identify caller icon 320, and a determine call reason icon 330. The home page display 300 may further include announcements 340, line of business information dashboard 350 selections, and quick links 360 that may be selected by the team member to access information in an efficient manner.

Figure 4:
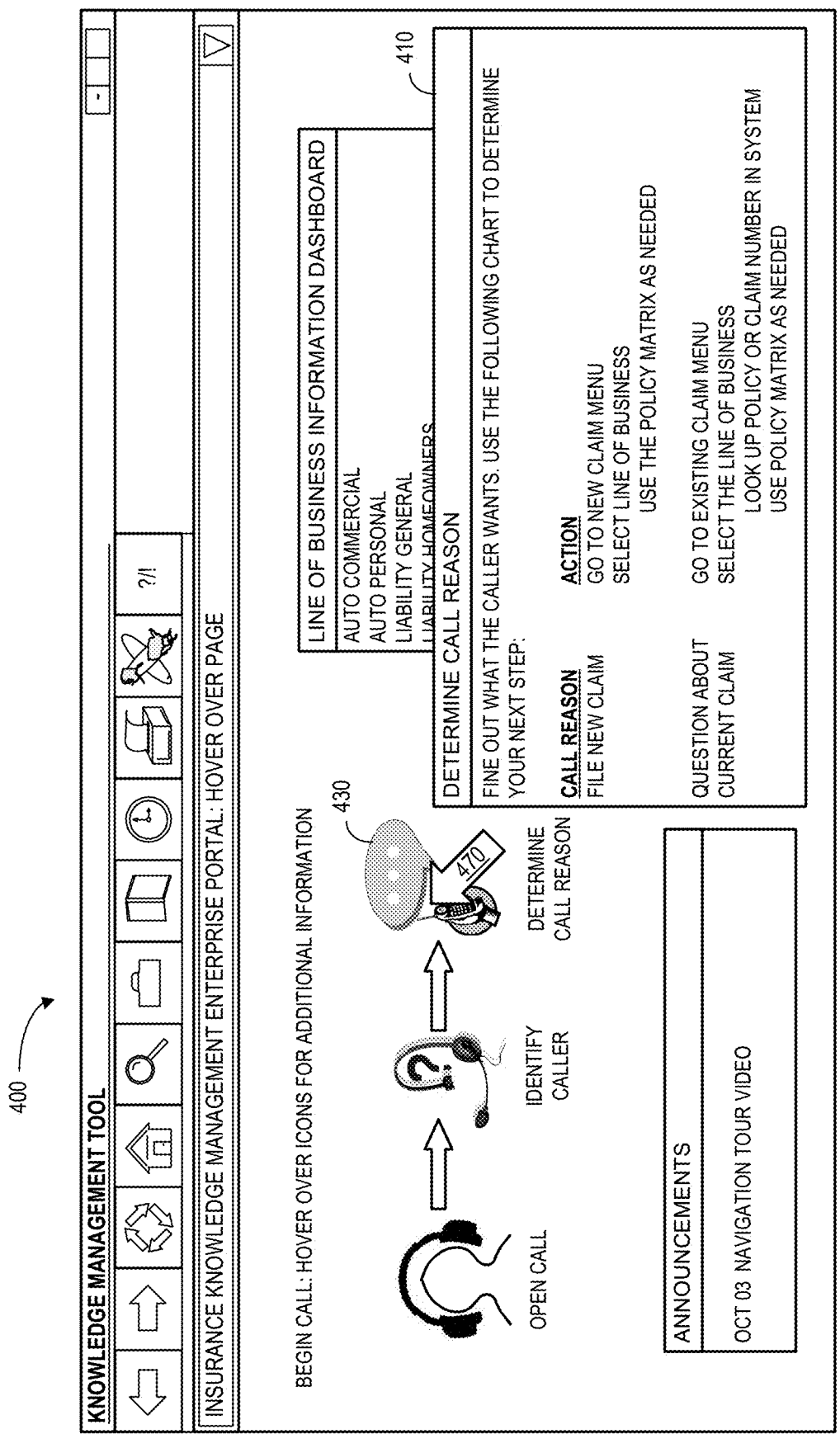
FIG. 4 illustrates an insurance knowledge management enterprise portal home page display with a hover over page according to some embodiments.

According to some embodiments, a team member may move a cursor 370 over any of the icons 310, 320, 330 and more information about the appropriate task will be displayed in a pop-up window. For example, FIG. 4 illustrates an insurance knowledge management enterprise portal home page display 400 with a hover over page 410 according to some embodiments. In particular, the team member moved the cursor 470 over the determine call reason icon 430 causing details about how to quickly and accurately determine the reason for a customer's call to be displayed in a pop-up window. Moving the cursor 430 away from the determine call reason icon 430 may, according to some embodiments, cause the pop-up window 410 to be automatically removed (e.g., reducing clutter on the display 400).

Figure 5:
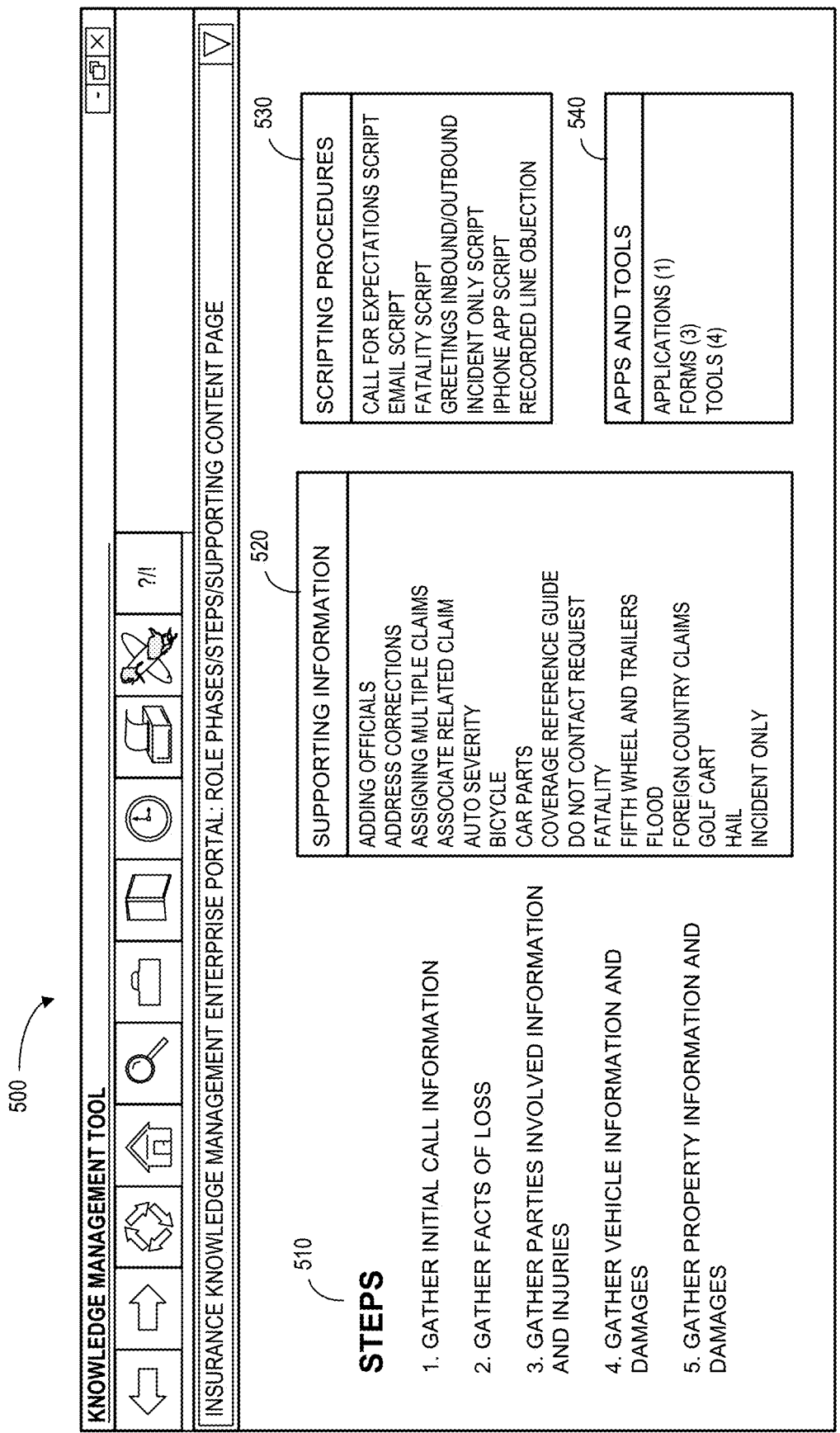
FIG. 5 illustrates an insurance knowledge management enterprise portal role phases/steps/supporting content page display in accordance with some embodiments.

FIG. 5 illustrates an insurance knowledge management enterprise portal role phases/steps/supporting content page display 500 in accordance with some embodiments. The page display 500 may, for example, include a list of steps 510 the team member can take to gather information about an accident or incident. The page display 500 may also include supporting information (e.g., to let the team member access information about how to correct addresses, collect information about hail damage, etc.). The page display 500 may further include scripting procedures 530 along with a list of applications, tools, and/or forms 540 that may be available to the team members (e.g., and the list might be automatically and dynamically updated, for example, based on the team member's role and the event that triggered the customer's telephone call).

Figure 6:
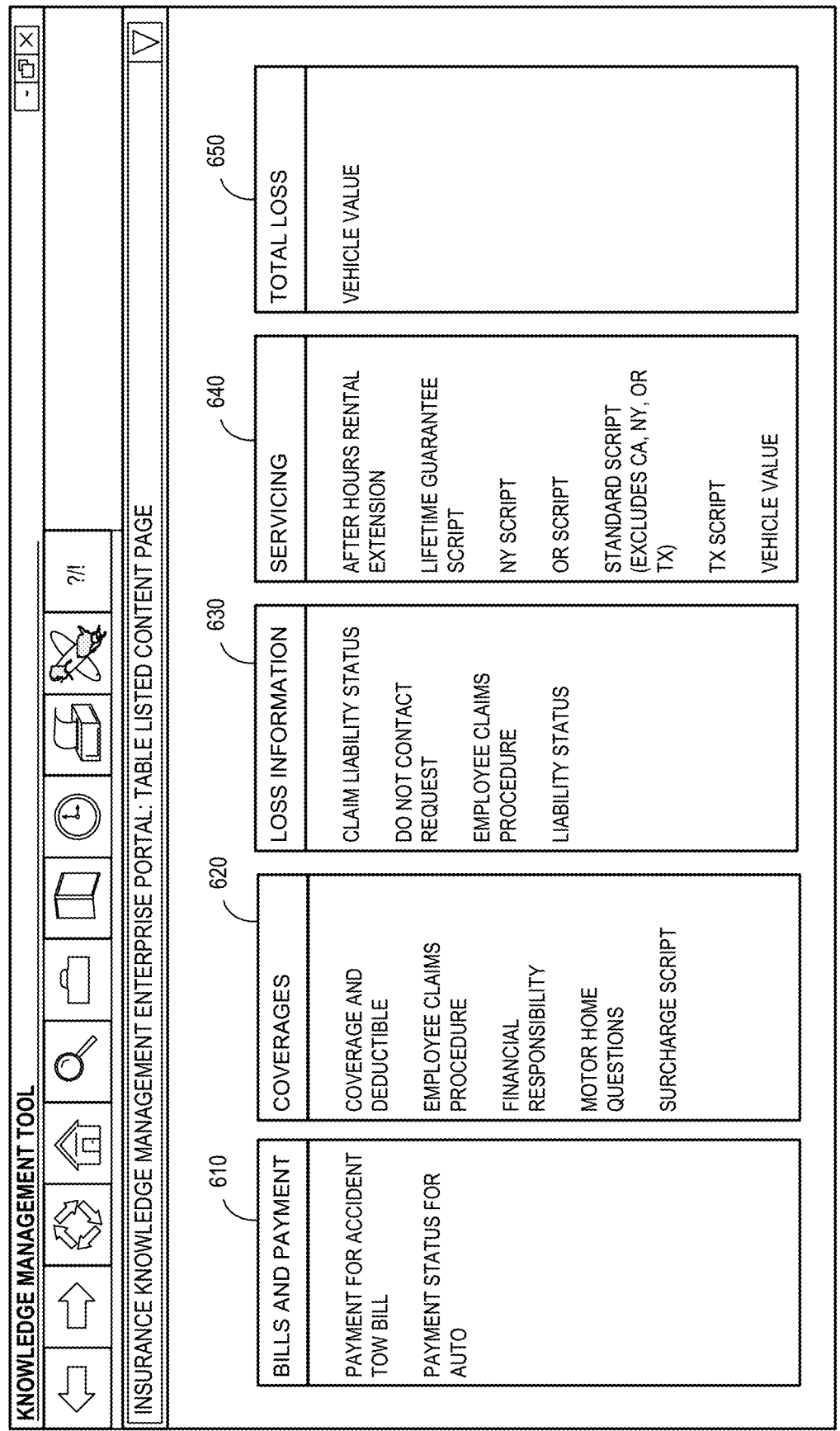
FIG. 6 illustrates an insurance knowledge management enterprise portal table listed content page display according to some embodiments.

FIG. 6 illustrates an insurance knowledge management enterprise portal table listed content page display 600 according to some embodiments. The table listed content page display 600 may include, for example, information about bills and payment 610, coverages 620, loss information 630, servicing 640, and/or total loss data 650. In this way, a service representative may quickly see what information is available from the knowledge management system and be able to access that information quickly to better serve the customer (e.g., by selecting a title from one of the areas 610, 620, 630, 640, 650).

Figure 7:
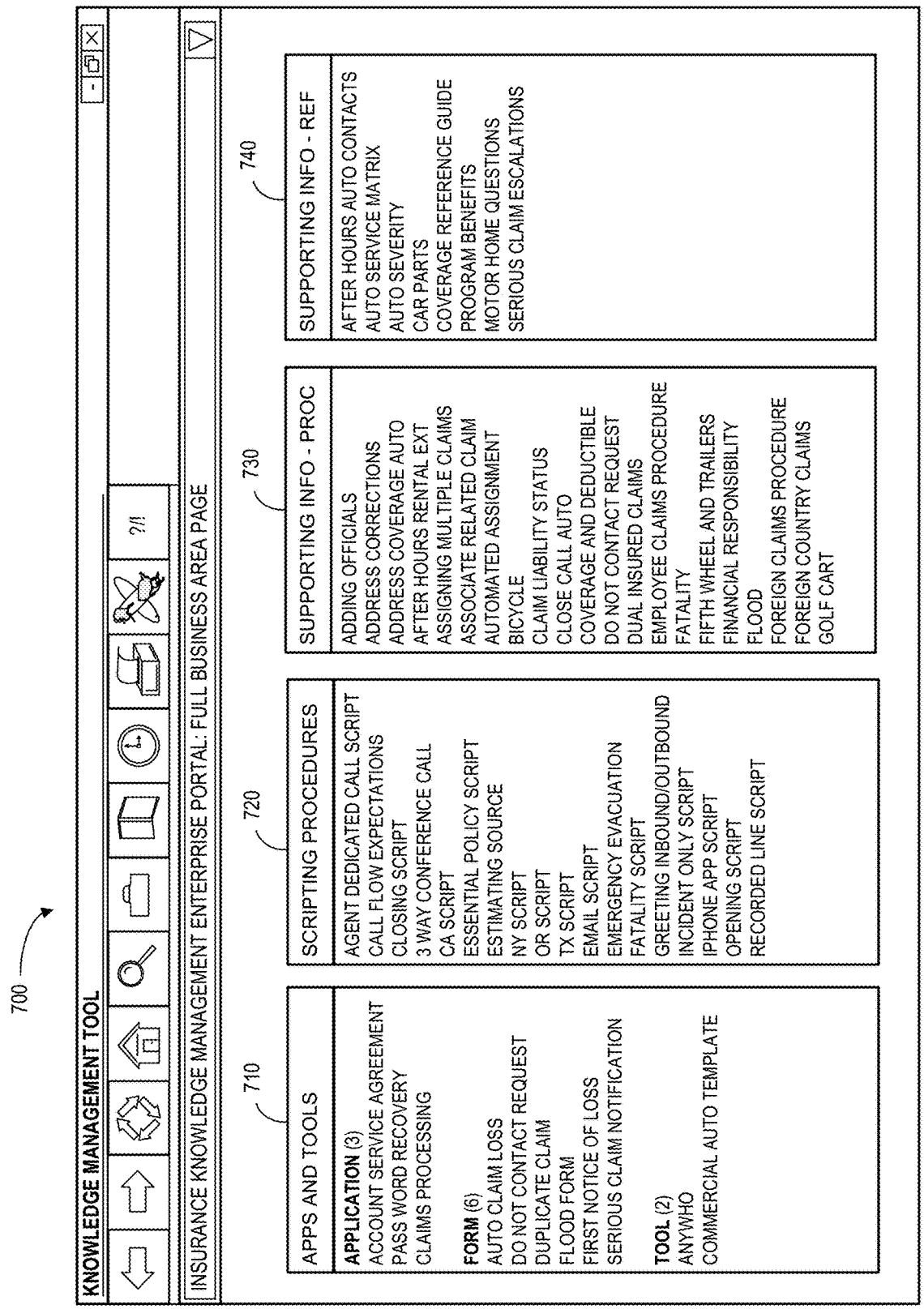
FIG. 7 illustrates an insurance knowledge management enterprise portal full business area page display in accordance with some embodiments.

FIG. 7 illustrates an insurance knowledge management enterprise portal full business area page display 700 in accordance with some embodiments. The full business area display may include, for example, a list of applications, tools, and/or forms 710 that are available to the service representative. Note that this list 710 may be more extensive as compared to the applications and tools list 540 displayed on the content page 500 of FIG. 5 (e.g., to reduce clutter on the content page 500 but still allow the team member to access all of the information available from the knowledge management tool portal). The full business area page display 700 may further include a complete list of scripting procedures 720 (more extensive as compared to the scripting procedures 530 displayed on the content page 500 of FIG. 5), supporting information procedures 730 (e.g., about how to properly acquire information about a flood incident, foreign country claims, etc.), and supporting information references 740 (e.g., an automobile service matrix, a coverage reference guide, etc.).

FIG. 8 illustrates an insurance knowledge management enterprise portal directory page display 800 according to some embodiments. The directory page display 800 may comprise a complete list of the general contact information arranged alphabetically, including a general telephone phone number, employee contact, and/or specific employee number for each department (e.g., a boiler claim department, a specific business center, etc.). According to some embodiments, a service representative can select a name on the directory page display 800 to view additional information, such as an address and/or hours of operation associated with that name. Note that a search box may be implemented to let a customer care member locate a resource he or she needs to quickly and accurately serve the insurance customer.

Figure 9:
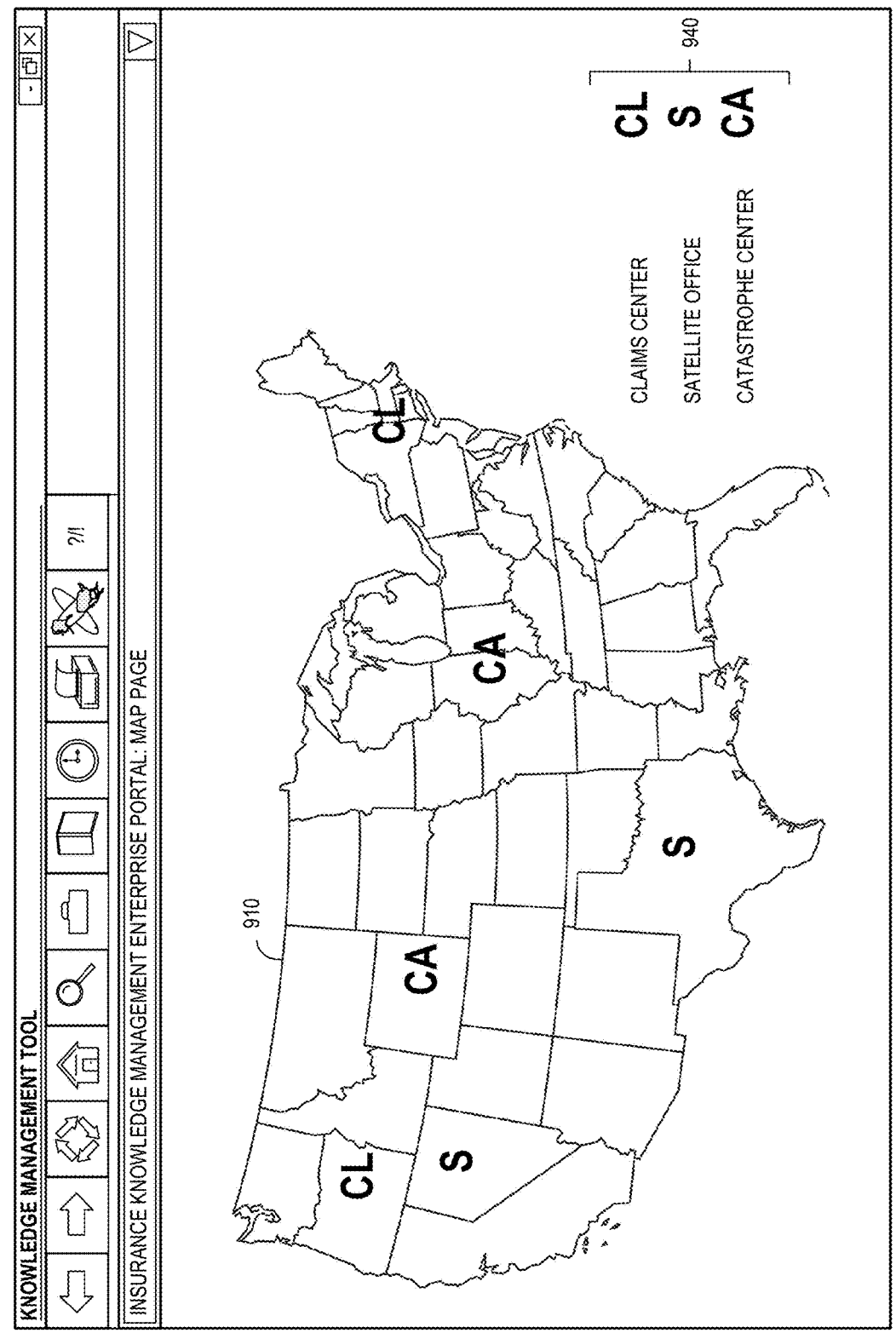
FIG. 9 illustrates an insurance knowledge management enterprise portal map page display in accordance with some embodiments.

FIG. 9 illustrates an insurance knowledge management enterprise portal map page display 900 in accordance with some embodiments. The map page display 900 may, for example, use icons to display the geographic location of claims centers (a "CL" icon), satellite offices (an "S" icon), catastrophe centers (a "CA" icon), etc. 940 on a map 910. According to some embodiments, selecting or hovering over one of those icons 940 on the map 910 will display additional information about that resource (e.g., a mailing address and/or hours of operation).

FIG. 10 illustrates an insurance knowledge management enterprise portal office directory page display 1000 according to some embodiments. The office directory page display 1000 illustrated in FIG. 10 provides, by way of example only, information about a customer care team catastrophe office 1010, including a phone number, fax number, mailing address, delivery address, email address, and a property gatekeeper list. The office directory page display 1000 may also include a catastrophe after hours contact list 1020 including, a start date for the contact, an end date for the contact, a name for the on-call contact, a primary telephone number, a team leader name, and a team leader telephone number to help a customer care member locate an appropriate party to quickly and accurately serve the insurance customer.

Figure 11:
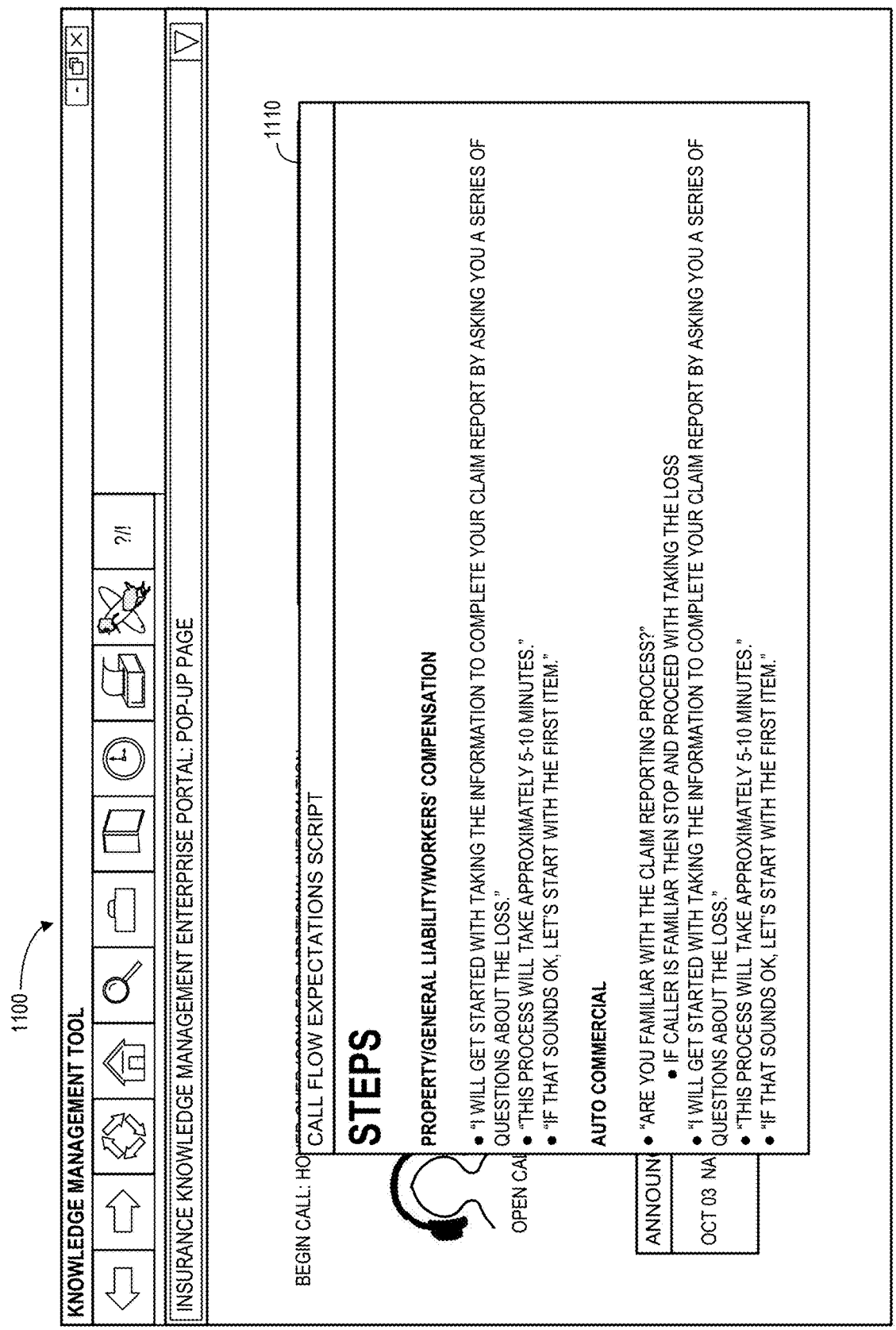
FIG. 11 illustrates an insurance knowledge management enterprise portal home page with a pop-up page display in accordance with some embodiments.

FIG. 11 illustrates an insurance knowledge management enterprise portal home page 1000 with a pop-up page display 1110 in accordance with some embodiments. In the example of FIG. 11, the pop-up page display 1110, which may be provided to the service representative instead of an entirely new page, may include a list of scripted steps the service representative should use when interacting with the insurance customer in different scenarios (e.g., to handle a property or general liability insurance claim as compared to a commercial automobile insurance claim).

Figure 12:
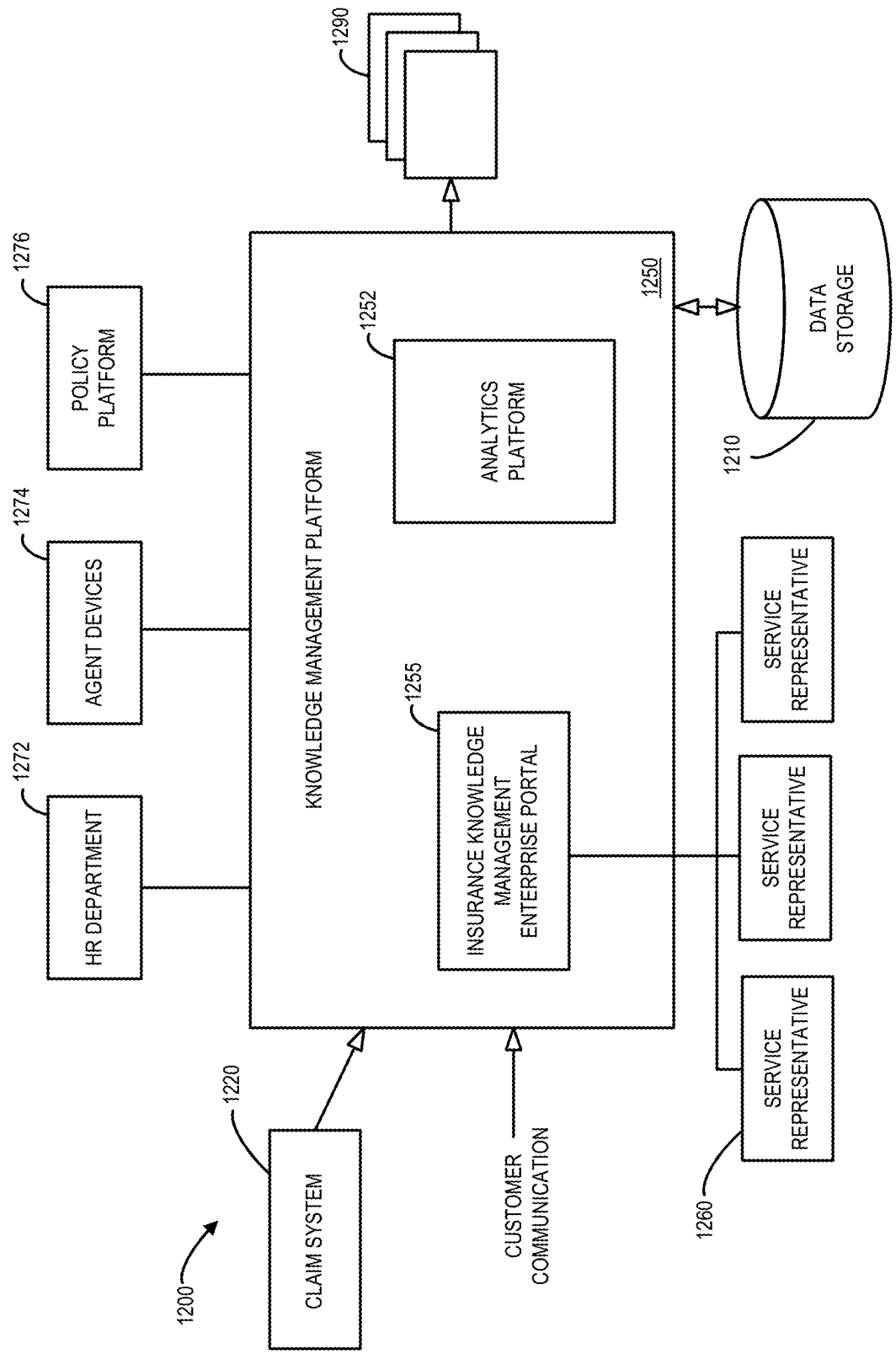
FIG. 12 is block diagram of a knowledge management system according to some embodiments of the present invention.

FIG. 12 is block diagram of a knowledge management system 1200 according to some embodiments of the present invention. As in the system 100 of FIG. 1, a knowledge management platform 1250 may receive a customer communication and transmit data associated with an insurance knowledge management enterprise portal 1255 to one or more team member devices 1260. The knowledge management platform 1250 may update the portal, according to some embodiments, based on information from a claim system 1220, a Human Resources ("HR") department device 1272 (e.g., when a team member is out of the office), insurance agent devices 1274, and/or a policy platform device 1276 (e.g., to determine an insurance policy number, policyholder name and address, etc.). The system may further include one or more external platforms 1290 (e.g., a workflow server, email server, and/or calendaring application) and a data storage element 1210 (e.g., to store a history of service representative interactions with insurance customers).

According to some embodiments, the knowledge management platform 1250 may further include an analytics platform or engine 1252 to collect data associated with a plurality of communications from a plurality of customers. For example, the analytics platform 1252 may collect data associated with a plurality of service representative devices 1260. In this way, the analytics platform 1252 might, for example, use that data to dynamically and automatically adjust the insurance knowledge management enterprise portal, such as by maintaining a dynamically and automatically updated list of links to information based on a number of times each link was accessed by service representative devices during a pre-defined period of time (e.g., by displaying the most frequently accessed resources during the last thirty days on a team member's home page). One example of an analytics platform 1252 might be associated with ADOBE® INSIGHT® which might track service representative selections and dynamically update the insurance knowledge management enterprise portal 1255 as appropriate (e.g., to reduce the number of selections team members need to make to reach particular pages of information). According to some embodiments, the insurance knowledge management enterprise portal 1255 is able to automatically receive feedback information from the service representative devices 1260 (e.g., a score or other rating that indicates if a particular resource was, or was not, helpful) and/or the customer (e.g., via a customer satisfaction survey). This information may also be used to dynamically update the insurance knowledge management enterprise portal 1255 as appropriate.

Figure 13:
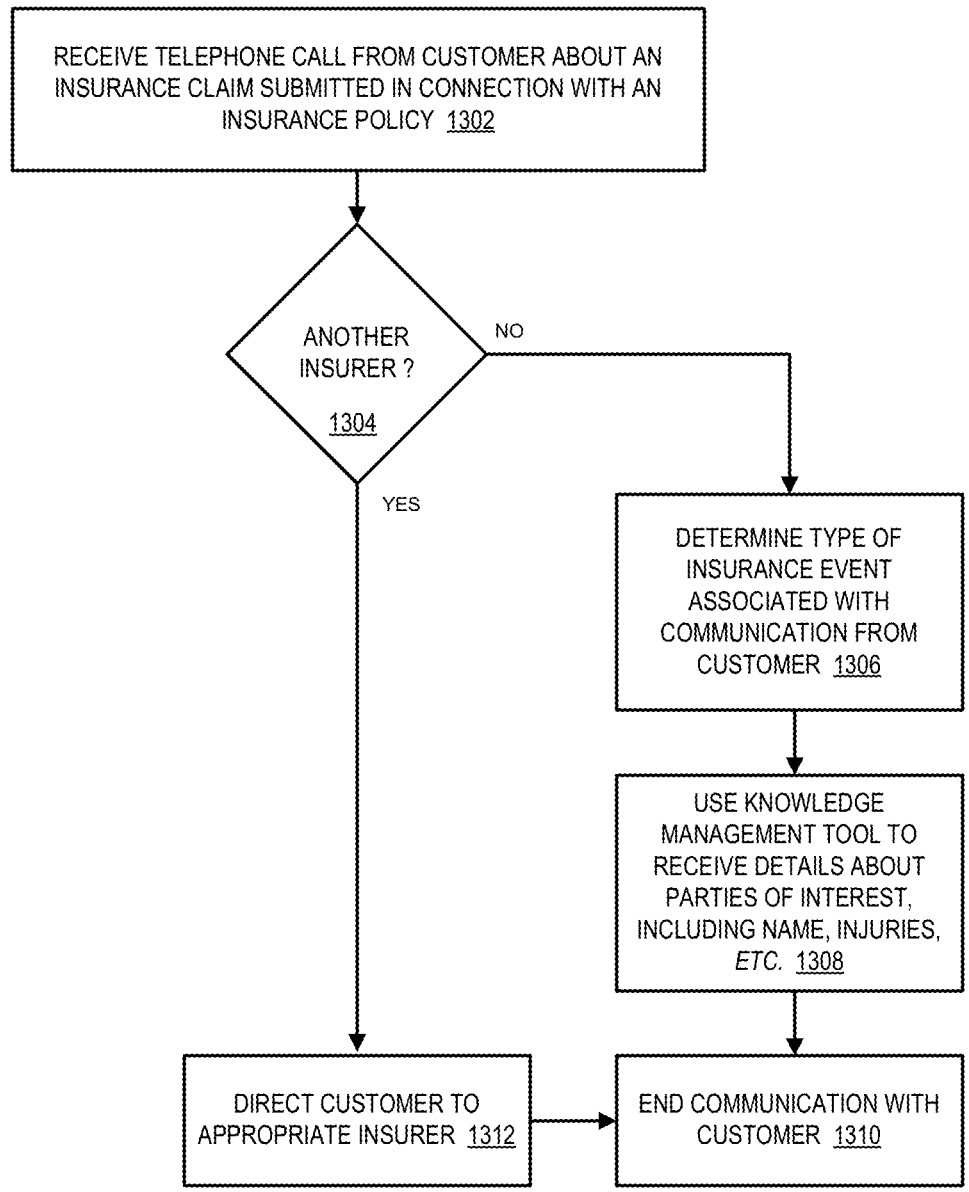
FIG. 13 illustrates a method that might be performed in accordance with some embodiments.

FIG. 13 illustrates a method that might be performed in accordance with some embodiments. At 1302, a service representative working for an insurer may receive a telephone call about an insurance claim submitted in connection with an insurance policy. At 1304, it may be determined if that particular insurance claim and/or policy is associated with the insurer. For example, an insurance policy matrix and/or assigned risk information may be searched to determine an insurance enterprise associated with that particular claim and/or policy. If the claim and/or policy is associated with the insurer at 1304, the system may determine a type of insurance event associated with the customer's call at 1306. A service representative may then use the knowledge management tool at 1308 when interacting with the customer to receive details about the parties involved in the name, such as the name and/or any injury information associated with each party, before ending the communication with the customer at 1310. If it was determined at 1304 the particular insurance claim and/or policy is in fact associated with another insurer, the service representative can direct the customer to the appropriate insurer at 1312 (e.g., by giving the customer the phone number of the insurance enterprise that is actually associated with the policy and/or claim) before ending the communication with the customer at 1310. Thus, an insurance knowledge management enterprise portal may include an insurance policy identifier search function, and the search function may be able to search identifiers including identifiers not associated with the insurer.

Figure 14:
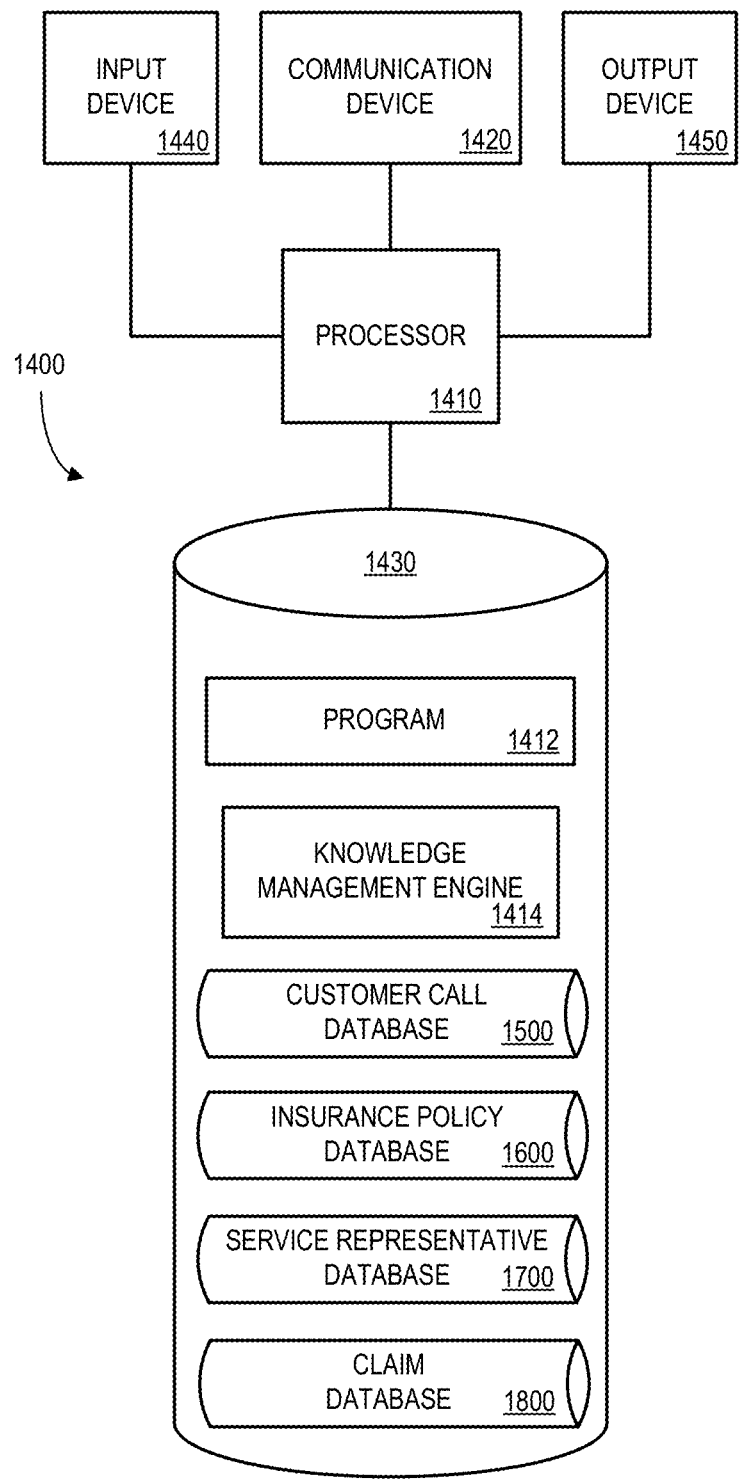
FIG. 14 is block diagram of a knowledge management enterprise portal tool or platform according to some embodiments of the present invention.

Note that the embodiments described herein may be implemented using any number of different hardware configurations. For example, FIG. 14 illustrates a knowledge management platform 1400 that may be, for example, associated with the systems 100, 1200 of FIGS. 1 and 12. The knowledge management platform 1400 comprises a processor 1410, such as one or more commercially available Central Processing Units (CPUs) in the form of one-chip microprocessors, coupled to a communication device 1420 configured to communicate via a communication network (not shown in FIG. 14). The communication device 1420 may be used to communicate, for example, with one or more remote service representative devices. The knowledge management platform 1400 further includes an input device 1440 (e.g., a mouse and/or keyboard to enter information about portal page layouts and links) and an output device 1450 (e.g., to output an indication of a summary report for a line of business or group of service representatives).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a knowledge management engine 1414 for controlling the processor 1410. The processor 1410 performs instructions of the programs 1412, 1414, and thereby operates in accordance with any of the embodiments described herein. For example, the processor 1410 may receive a communication from a customer in connection with an insurance policy. The processor 1410 may then transmit, to a service representative device, data associated with an insurance knowledge management enterprise portal displaying information to facilitate interaction with the customer. A type of insurance event associated with the communication from the customer may be determined by the processor 1410, and customized data associated with the insurance knowledge management enterprise portal may be transmitted to the service representative device, the customized data being based at least in part on the type of insurance event associated with the communication from the customer.

The programs 1412, 1414 may be stored in a compressed, uncompiled and/or encrypted format. The programs 1412, 1414 may furthermore include other program elements, such as an operating system, a database management system, and/or device drivers used by the processor 1410 to interface with peripheral devices.

As used herein, information may be "received" by or "transmitted" to, for example: (i) the knowledge management platform 1400 from another device; or (ii) a software application or module within the knowledge management platform 1400 from another software application, module, or any other source.

In some embodiments (such as shown in FIG. 14), the storage device 1430 further stores a customer call database 1500, an insurance policy database 1600, a service representative database 1700, and claim database 1800. Examples of databases that may be used in connection with the knowledge management platform 1400 will now be described in detail with respect to FIGS. 15 through 18. Note that the databases described herein are only examples, and additional and/or different information may be stored therein. Moreover, various databases might be split or combined in accordance with any of the embodiments described herein. For example, the customer call database 1500 and/or the team member database 1700 might be combined and stored within the knowledge management engine 1414.

Figure 15:
FIG. 15 is a tabular portion of a customer call database according to some embodiments.

Referring to FIG. 15, a table is shown that represents the customer call database 1500 that may be stored at the knowledge management platform 1400 according to some embodiments. The table may include, for example, entries identifying telephone calls from insurance customers received and processed in accordance with some embodiments described herein. The table may also define fields 1502, 1504, 1506, 1508, 1510, 1512 for each of the entries. The fields 1502, 1504, 1506, 1508, 1510, 1512 may, according to some embodiments, specify: a customer call identifier 1502, a customer name 1504, an insurance policy number 1506, a claim number 1508, a reason for the call 1510, and a status 1512. The customer call database 1500 may be created and updated, for example, as telephone calls from customers are answered and/or processed.

The customer call identifier 1502 may be, for example, a unique alphanumeric code identifying a telephone call that has been received from a customer. The customer name 1504, policy number 1506, and claim number 1508 may be received from the customer and/or be automatically populated as appropriate based on information stored in other database. The reason for the telephone call 1510 might be determined by a service representative and the status 1512 might indicate that the reason for the call is still "in process" or has been "closed" (e.g., the customer's request has been completely processed and/or his or her question has been answered).

Figure 16:
FIG. 16 is a tabular portion of an insurance policy database according to some embodiments.

Referring to FIG. 16, a table is shown that represents the insurance policy database 1600 that may be stored at the knowledge management platform 1400 according to some embodiments. The table may include, for example, entries identifying insurance policies that have been sold by an insurer to customers in accordance with some embodiments described herein. The table may also define fields 1602, 1604, 1606, 1608, 1610, 1612 for each of the entries. The fields 1602, 1604, 1606, 1608, 1610, 1612 may, according to some embodiments, specify: an insurance policy identifier 1602, an insured name 1604, a type of insurance 1606, an insured address 1608, pending claims 1610, and a status 1612. The insurance policy database 1600 may be created and updated, for example, as insurance policies are sold, renewed, claims are processed, etc.

The insurance policy identifier 1602 may be, for example, a unique alphanumeric code identifying an insurance policy that has been sold by the insurer to a customer (e.g., a person or business) and might be used, according to some embodiments, to automatically populate the policy number 1506 in the customer call database 1500. The insured 1604 might indicate, for example, the name of the policy holder and might be used, according to some embodiments, to automatically populate the customer name 1504 in the customer call database 1500. The type of insurance 1604 might indicate, for example, a line of business associated with the insurance policy, and the insured address might represent the postal address of the policy holder. Any pending claim may be stored in the pending claims field 1610 along with the current status of the insurance policy (e.g., the insurance policy is "active" and in effect or has "expired" and is not currently in effect).

Figure 17:
FIG. 17 is a tabular portion of a team member database according to some embodiments.

Referring to FIG. 17, a table is shown that represents the service representative database 1700 that may be stored at the knowledge management platform 1400 according to some embodiments. The table may include, for example, entries identifying service representatives who may be available to answer customer telephone calls using the knowledge management tool accordance with some embodiments described herein. The table may also define fields 1702, 1704, 1706, 1708 for each of the entries. The fields 1702, 1704, 1706, 1708 may, according to some embodiments, specify: a service representative 1702, a last customer call 1704, a roll 1706, and a status 1708. The service representative database 1700 may be created and updated, for example, as service representatives are hired, answer customer telephone calls, go on vacation, etc.

The service representative identifier 1702 may be, for example, a unique alphanumeric code identifying a service representative who might be available to answer customer telephone calls using the knowledge management tool accordance with some embodiments described herein. The last customer call 1704 might indicate the last telephone call answered by the service representative and might be based on otherwise associated with the customer call identifier 1502 of the customer call database 1500. The roll 1706 might indicate the types of telephone calls that are typically handled by the service representative. According to some embodiments, the roll 1706 may be used to customer pages in the knowledge management tool for the service representative. The status 1708 might indicate, for example, that the service representative is available to answer customer telephone calls, is currently busy, etc.

Figure 18:
FIG. 18 is a tabular portion of a claim database according to some embodiments.

Referring to FIG. 18, a table is shown that represents the claim database 1800 that may be stored at the knowledge management platform 1400 according to some embodiments. The table may include, for example, entries identifying insurance claims being processed in accordance with some embodiments described herein. The table may also define fields 1802, 1804, 1806, 1808, 1810, 1812 for each of the entries. The fields 1802, 1804, 1806, 1808, 1810, 1812 may, according to some embodiments, specify: a claim identifier 1802, an insurance policy 1804, a last call identifier 1806, a service representative 1808, damages 1810, and a status 1812. The claim database 1800 may be created and updated, for example, as insurance claim from customers are opened and/or processed.

The claim identifier 1802 may be, for example, a unique alphanumeric code identifying an insurance claim submitted by a customer and may, according to some embodiments, be used to automatically populate the claim number 1508 in the customer call database 1500. The insurance policy 1804 may identify the insurance policy associated with the claim and may be based on or otherwise associated with the insurance policy identifier 1602 in the insurance policy database 1600. The last call identifier 1806 may identify the last telephone call received from the customer in connection with the insurance claim and the service representative 1808 may identify the service representative who answered that call. The damages 1810 may represent a monetary value associated with the claim, and the status 1812 might indicate that the claim is currently "pending" or "closed" (and whether or not the damages 1810 have been paid to the policyholder).

In this way, embodiments described herein may help service representatives helpfully and efficiently interact with customers in substantially real time. The knowledge management tool portal pages may be designed (and, according to some embodiments, automatically and/or dynamically re-arranged) such that important information may be available to team members with a relatively small number of selections (e.g., team members might be able to access important information and features with fewer than five or any other number of selections, or within ten or any other number of seconds, etc.).

Figure 19:
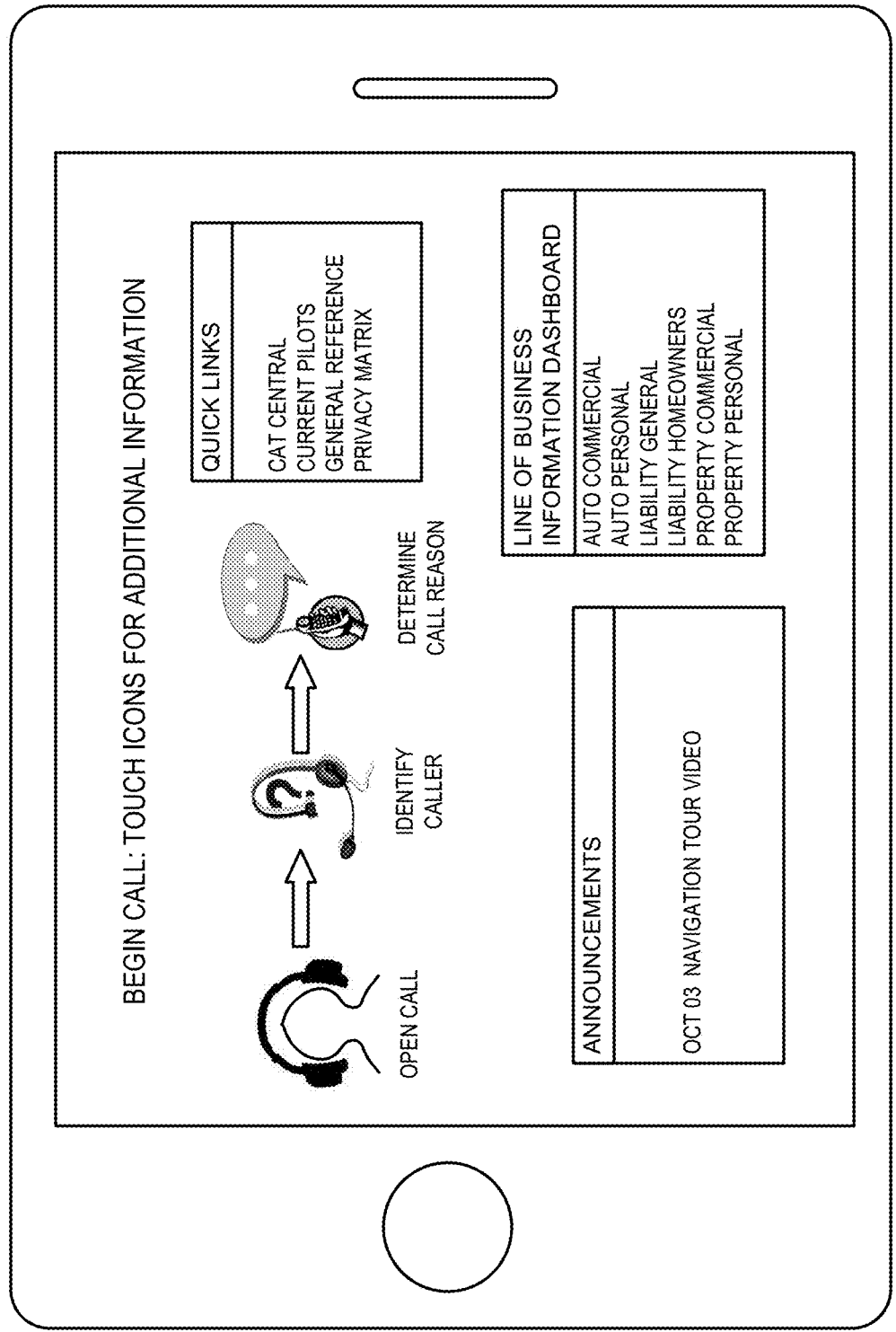
FIG. 19 illustrates a tablet computer with an insurance knowledge management enterprise portal home page display in accordance with some embodiments.

Applicants have discovered that embodiments described herein may be particularly useful in connection with the types pf insurance policies described herein. Note, however, that other types of insurance may also be associated with embodiments described herein. Moreover, the displays illustrated with respect to the present FIGS. are only provided as examples, and embodiments may be associated with more displays (e.g., an insurance knowledge management tool might actually have hundreds or more individual pages) and any other types of user interfaces. For example, FIG. 19 illustrates a tablet computer 1900 according to some embodiments. In particular, the tablet computer 1900 is displaying an insurance knowledge management enterprise portal home page display similar to the display 300 described with respect to FIG. 3.

Note that the present invention provides significant technical improvements to facilitate interactions between insurance customers and service representatives. The present invention is directed to more than merely a computer implementation of a routine or conventional activity previously known in the industry as it significantly advances the technical efficiency, access and/or accuracy of interactions between insurance customers and service representatives by implementing a specific new method and system as defined herein. The present invention is a specific advancement in the area of interactions between insurance customers and service representatives by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention tens of thousands of customer communications and/or team member selections may be analyzed and accurately and automatically responded to and/or processed.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A knowledge management platform including a knowledge management enterprise portal comprising:
    a communication device to receive a communication from a customer in connection with a risk mitigation coverage policy;
    a computer storage unit for receiving, storing, and providing data indicative of the communication from the customer;
    a knowledge management database storing risk mitigation coverage knowledge management enterprise portal information; and
    a knowledge management platform processor in communication with the communication device, the storage unit, and the knowledge management database, wherein the processor is configured for:
        receiving, via the communication device, the communication from the customer in connection with the risk mitigation coverage policy;
        automatically determining a role identifier associated with a service representative device accessing the knowledge management platform in relation to the communication from the customer;
        receiving, from the service representative device, data indicative of a line of business corresponding to the communication from the customer;
        determining a type of coverage event associated with the communication from the customer, the coverage event being associated with claim processing for one of two different potential lines of risk mitigation coverage, and
        rendering, for display on the service representative device, customized data associated with the knowledge management enterprise portal, the customized data being based at least in part on the determined type of coverage event and the role identifier associated with the service representative device, the customized data including:
            a dynamically updated tools dashboard displaying a list of most accessed information links, wherein selection of one link of the list of most accessed information links causes navigation to a corresponding accessed link page display, wherein links on the list of most accessed information links are selected based upon the role identifier associated with the service representative device and the type of coverage event, and wherein the list of most accessed information links provided on the tools dashboard is dynamically updated based upon access data collected by an analytics engine indicating a number of times each link available through the knowledge management enterprise portal was accessed by service representative devices during a pre-defined period of time.

2. The system of claim 1, where the knowledge management platform processor is further configured for, responsive to receiving the communication for the customer, rendering a line of business dashboard including a listing of line of business links, each line of business link corresponding to a different line of business, wherein selection of one link of the listing of line of business links causes navigation to a corresponding line of business page display including information about the line of business;

wherein receiving data indicative of the line of business corresponding to the communication from the customer comprises receiving a selection of the one link corresponding to the line of business.

3. The system of claim 1, where the knowledge management platform processor is further configured for:

responsive to receiving the communication for the customer, rendering, for display to the service representative device, a home page of the knowledge management enterprise portal which includes a plurality of hoverable icons including an open call icon, an identify caller icon, and a determine call reason icon, wherein each of the plurality of hoverable icons is configured for dynamically rendering, responsive to movement of a cursor over a respective hoverable icon, a hover-over window including information to facilitate interaction with the customer to obtain caller identity data and call reason data, and wherein each of the plurality of hoverable icons is configured to close the hover-over window responsive to movement of the cursor away from the respective hoverable icon.

4. The system of claim 1, where the knowledge management platform processor is further configured for:

rendering, for display on the service representative device, customized data associated with the knowledge management enterprise portal, the customized data being based at least in part on the determined type of coverage event and the role identifier associated with the service representative device, the customized data including:

a scripting procedures dashboard including a list of selectable scripts, wherein selection of one of the list of selectable scripts causes a pop-up display of a corresponding script to be displayed over at least a portion of a currently displayed page.

5. The system of claim 1, wherein the customized data further comprises at least one of: (i) data selected from the knowledge management database, and (ii) data dynamically modified by the knowledge management platform processor in substantially real time.

6. The system of claim 1, wherein the analytics engine is further configured to collect data associated with a plurality of communications from a plurality of customers.

7. The system of claim 6, wherein the analytics engine is further configured to collect data associated with a plurality of service representative devices.

8. The system of claim 1, wherein the risk mitigation coverage knowledge management enterprise portal is configured to automatically receive feedback information from at least one of: (i) the service representative device, and (ii) the customer.

9. A computer-implemented method for risk mitigation knowledge management, comprising:

receiving, by a knowledge management platform processor of a knowledge management platform providing a knowledge management enterprise portal, a communication from a customer in connection with a risk mitigation coverage policy;

automatically determining, by the knowledge management platform processor, a role identifier associated with a service representative device accessing the knowledge management enterprise portal in relation to the communication from the customer;

receiving, by the knowledge management platform processor from the service representative device, data indicative of a line of business corresponding to the communication from the customer;

automatically determining, by the knowledge management platform processor, a type of coverage event associated with the communication from the customer, the coverage event being associated with risk mitigation coverage claims processing; and automatically rendering, by the knowledge management platform processor for display on the service representative device, customized data associated with the knowledge management enterprise portal, the customized data being based at least in part on the type of coverage event associated with the communication from the customer and the role identifier associated with the service representative device, the customized data including:

a dynamically updated tools dashboard displaying a list of most accessed information links, wherein selection of one link of the list of most accessed information links causes navigation to a corresponding accessed link page display, wherein links on the list of most accessed information links are selected based upon the role identifier associated with the service representative device and the type of coverage event, and wherein the list of most accessed information links provided on the tools dashboard is dynamically updated based upon data collected by an analytics engine indicating a number of times each link available through the knowledge management enterprise portal was accessed by service representative devices during a pre-defined period of time.

10. The method of claim 9, further comprising, responsive to receiving the communication for the customer, rendering, by the knowledge management platform processor, a line of business dashboard including a listing of line of business links, each link corresponding to a different line of business, wherein selection of one link of the listing of line of business links causes navigation to a corresponding line of business page display including information about the line of business;

wherein receiving data indicative of the line of business corresponding to the communication from the customer comprises receiving a selection of the one link corresponding to the line of business.

11. The method of claim 10, further comprising, responsive to receiving the communication for the customer, rendering, by the knowledge management platform processor for display on the service representative device, a home page of the knowledge management enterprise portal which includes a plurality of hoverable icons including an open call icon, an identify caller icon, and a determine call reason icon, wherein each of the plurality of hoverable icons is configured for dynamically rendering, responsive to movement of a cursor over a respective hoverable icon, a hover-over window including information to facilitate interaction with the customer to obtain caller identity data and call reason data, and wherein each of the plurality of hoverable icons is configured to close the hover-over window responsive to movement of the cursor away from the respective hoverable icon.

12. The method of claim 11, further comprising rendering, by the knowledge management platform processor for display on the service representative device, customized data associated with the knowledge management enterprise portal, the customized data being based at least in part on the determined type of coverage event and the role identifier associated with the service representative device, the customized data including:
- a scripting procedures dashboard including a list of selectable scripts, wherein selection of one of the list of selectable scripts causes a pop-up display of a corresponding script to be displayed over at least a portion of a currently displayed page.

13. The method of claim 9, further comprising:
automatically determining, by the knowledge management platform processor, a risk mitigation coverage policy identifier associated with the risk mitigation coverage policy;
wherein the customized data is further based at least in part on information accessed using the automatically determined risk mitigation coverage policy identifier.

14. The method of claim 9, wherein the communication from the customer comprises an incoming telephone call, and the risk mitigation coverage policy is associated with at least one of: (i) commercial automobile risk mitigation coverage, (ii) personal automobile risk mitigation coverage, (iii) general liability risk mitigation coverage, (iv) homeowners liability risk mitigation coverage, (v) commercial property risk mitigation coverage, (vi) group benefits risk mitigation coverage, and (vii) personal property risk mitigation coverage.

15. The method of claim 9, further comprising collecting, by the analytics engine, data associated with a plurality of communications from a plurality of customers.

16. The system of claim 15, further comprising collecting, by the analytics engine, data associated with a plurality of service representative devices.

* * * * *